US010260645B2

(12) United States Patent
Rösler et al.

(10) Patent No.: US 10,260,645 B2
(45) Date of Patent: Apr. 16, 2019

(54) SHUTTLE VALVE FOR A SAFETY VALVE ARRANGEMENT AND SAFETY VALVE ARRANGEMENT

(71) Applicant: LESER GmbH & Co. KG, Hamburg (DE)

(72) Inventors: Jörg Rösler, Neumünster (DE); Rasim Boydag, Tornesch (DE); Björn Büchner, Klein Offenseth-Sparrieshoop (DE); Christopher Lie Indah Wahju, Hamburg (DE)

(73) Assignee: LESER GmbH & Co. KG, Hamburg (DE)

( * ) Notice: Subject to any disclaimer, the term of this patent is extended or adjusted under 35 U.S.C. 154(b) by 0 days.

(21) Appl. No.: 15/492,546

(22) Filed: Apr. 20, 2017

(65) Prior Publication Data

US 2017/0307088 A1   Oct. 26, 2017

(30) Foreign Application Priority Data

Apr. 21, 2016 (EP) ..................... 16166392

(51) Int. Cl.
| | |
|---|---|
| *F16K 11/044* | (2006.01) |
| *F16K 31/50* | (2006.01) |
| *F16K 31/60* | (2006.01) |
| *F16K 11/052* | (2006.01) |
| *F16K 17/00* | (2006.01) |

(52) U.S. Cl.
CPC .......... *F16K 11/044* (2013.01); *F16K 11/052* (2013.01); *F16K 31/502* (2013.01); *F16K 31/508* (2013.01); *F16K 31/60* (2013.01); *F16K 17/00* (2013.01)

(58) Field of Classification Search
USPC .................................................. 137/625.44
See application file for complete search history.

(56) References Cited

U.S. PATENT DOCUMENTS

| | | | | |
|---|---|---|---|---|
| 2,720,214 | A | * | 10/1955 | Rupp ..................... F16K 35/14 |
| | | | | 137/315.04 |
| 2,852,947 | A | | 9/1958 | Klingler |
| 3,080,884 | A | * | 3/1963 | Nelson .................. F16K 11/052 |
| | | | | 137/315.16 |
| 3,605,811 | A | | 9/1971 | Lovell |

(Continued)

FOREIGN PATENT DOCUMENTS

| | | |
|---|---|---|
| EP | 1 498 647 A1 | 1/2005 |
| RU | 69606 U1 | 12/2007 |

(Continued)

*Primary Examiner* — John Fox
(74) *Attorney, Agent, or Firm* — McGlew and Tuttle, P.C.

(57) ABSTRACT

A shuttle valve for a safety valve arrangement is provided with a valve housing (2), which includes a fluid inlet (4) and two fluid outlets (6, 8). A movable shut-off body (12) is arranged in the valve housing (2) and can be moved between two closure positions, in which the movable shut-off body (12) closes one of the fluid outlets (6, 8). The shut-off body (12) is arranged in a pivotably about a pivot axis (D). The shuttle valve includes a linear drive (46) which is coupled to the shut-off body (12) in a manner such that the shut-off body (12) is pivotable between its two closure positions by moving the linear drive (46).

20 Claims, 6 Drawing Sheets

(56) References Cited

U.S. PATENT DOCUMENTS

| | | | | |
|---|---|---|---|---|
| 4,730,355 A | * | 3/1988 | Kreinbihl | E04H 4/0006 137/872 |
| 4,807,665 A | * | 2/1989 | Schiel | F16K 11/0525 137/625.4 |
| 4,979,244 A | | 12/1990 | Bastenhof | |
| 4,986,308 A | * | 1/1991 | Champseaux | F16K 7/16 137/625.44 |
| 7,779,867 B2 | * | 8/2010 | Bai | F16K 7/14 137/625.44 |

FOREIGN PATENT DOCUMENTS

| | | |
|---|---|---|
| RU | 15 1614 U1 | 4/2015 |
| WO | 2015/030909 A1 | 3/2015 |

\* cited by examiner

SHUTTLE VALVE FOR A SAFETY VALVE ARRANGEMENT AND SAFETY VALVE ARRANGEMENT

CROSS REFERENCE TO RELATED APPLICATIONS

This application claims the benefit of priority under 35 U.S.C. § 119 of European Application 16 166 392.7, filed Apr. 21, 2016, the entire contents of which are incorporated herein by reference.

FIELD OF THE INVENTION

The invention relates to a shuttle valve for a safety valve arrangement and to a safety valve arrangement.

BACKGROUND OF THE INVENTION

Safety valve arrangements, with which a space of a technical facility which is under pressure is connected to two safety valves connected in parallel, via a shuttle valve which is serially connected in front of the two safety valves form the basis of the invention. For this, the shuttle valve has two fluid outlets, on which one of the two safety valves is arranged in each case, and selectively closes one of the two fluid outlets and thus the flow path to one of the two safety valves. Accordingly, only one of the safety valves is envisaged for relieving an unallowably high pressure in the space subjected to pressure, which e.g. can be a container or pipe conduit. This relief of the pressure is effected by way of a part of the fluid located in the space being let off via this safety valve until an allowable pressure prevails in the space again. The second safety valve merely forms a redundancy in the case of a defect of the first safety valve and then assumes its function after a corresponding switch-over. The shuttle valve moreover permits service or repair work on the safety valve which is not in flow connection with the space, wherein the safety of the space subjected to pressure is ensured with a full availability of the technical facility on account of the other safety valve.

Such shuttle valves on which the two fluid outlets are arranged on a valve housing lying directly opposite one another belong to the state of the art, wherein a shut-off body arranged between the fluid outlets can be linearly displaced in a manner such that it closes either the one or the other fluid outlet. With such shuttle valves, it has been found to be a problem that on account of the arrangement of the fluid outlets on the valve housing, the flow path is designed in a manner such that it can lead to flow losses or pressure losses in the shuttle valve. These flow losses or pressure losses in turn can have the effect that the safety valve serially connected subsequently to the non-closed fluid outlet possibly no longer correctly fulfils the envisaged function in the case of an overpressure in the space to be protected.

Moreover, shuttle valves comprising a rotatably mounted shut-off body which by way of a rotary drive can be rotated in a manner such that a flow channel running through the shut-off body creates a flow connection of the fluid inlet to one of the fluid outlets are known. Given a suitable design, as a rule favorable flow conditions prevail in these shuttle valves. However, with such shuttle valves, it has been found to be disadvantageous that their manufacture is generally very complicated and thus expensive, above all due to the necessary sealing of the shut-off body with respect to the valve housing. Moreover, soft-sealing materials limiting the application conditions (temperature, media resistance) are often necessary for the sealing.

SUMMARY OF THE INVENTION

Against this background, it is an object of the invention to provide a shuttle valve for a safety valve arrangement, said shuttle valve on the one hand having good throughflow characteristics as well as a wide temperature application range and on the other hand being able to be inexpensively manufactured. A further object of the invention lies in providing a safety valve arrangement which is improved with regard to the mentioned aspects.

The first-mentioned object is achieved by a shuttle valve comprising a valve housing comprising a fluid inlet and two fluid outlets and a movable shut-off body arranged in the valve housing. The movable shut-off body is moveable between two closure positions, wherein in each of the two closure positions the movable shut-off body closes one of the fluid outlets. A shut-off body pivot is provided with a shut-off body pivot axis. The shut-off body is connected to the shut-off body pivot to pivot about the pivot axis. A linear drive is coupled to the shut-off body such that the shut-off body is pivotable between the closure positions by moving the linear drive.

According to another aspect of the invention a safety valve arrangement is provided comprising plural safety valves and the shuttle valve of the invention.

The shuttle valve according to the invention is envisaged for application in a safety valve arrangement. It comprises a valve housing which comprises a fluid inlet and two fluid outlets which are each provided for the connection of safety valve. The shuttle valve moreover comprises a movable shut-off body which is arranged in the valve housing and which is movable between two closure positions, in which it closes one of the fluid outlets in each case.

The particularity of the shuttle valve according to the invention lies in the shut-off body being pivotably arranged about a pivot axis and the shuttle valve comprising a linear drive which is coupled to the shut-off body in a manner such that the shut-off body is pivotable between its closure positions by way of moving the linear drive. In this context, the valve housing of the shuttle valve is usefully configured such that the middle axes of the two fluid outlets provided on the valve housing lie in the pivot plane of the shut-off body. According to the invention, a rotatable or pivotable shut-off body is thus moved between its closure positions by way of a linear movement of the linear drive.

An advantage of the shut-off body which is pivotable in the described manner lies in the fact that a flow path running through the valve housing from the fluid inlet to the respective fluid outlet not closed by the shut-off body narrows in this housing only to an insignificant extent or preferably not at all, with respect to the fluid inlet and the fluid outlet, given a suitable design of the valve housing and/or of the shut-off body, so that preferably no or at most low pressure losses occur in the shuttle valve. A further advantage of the shuttle valve according to the invention lies in the fact that its design is less complicated and it is thus less expensive to manufacture than the shuttle valves known from the state of the art which have a shut-off body which is driven in rotation and which is rotatably mounted in the valve housing.

The linear drive of the shuttle valve according to the invention is preferably a hand-actuated linear drive and in particular a hand-actuated spindle drive. Thus, no external energy is necessary for adjusting the shut-off body from a first closure position into a second closure position, so that the shuttle valve can also be adjusted in the necessary manner even with an emergency situation caused by an energy failure. The preferred use of a hand-actuated spindle drive is advantageous inasmuch as spindle drives are largely maintenance-free and effect a mechanical self-locking, so that the shut-off body coupled to the spindle drive is reliably held in its respective closure position.

A movement axis of the linear drive preferably extends transversely to the pivot axis of the shut-off body. In this context, one usefully envisages the movement axis of the linear drive being radially distanced to the pivot axis of the shut-off body i.e. a linearly movable part of the linear drive is preferably movable in a plane normal to the pivot axis, wherein the movement of the linearly movable part is effected radially at the outer side of the pivot axis.

One further preferably envisages the linear drive engaging on the shut-off body in a manner radially distanced to the pivot axis of this. The shut-off body is thus preferably coupled in movement to a linearly movable part of the linear drive in a direct manner, wherein the linearly movable part is connected to the shut-off body in a region which is radially remote from the pivot axis of the shut-off body, in order to be able to produce a moment which is necessary for pivoting the shut-off body.

Usefully, the shut-off body comprises two sealing surfaces which are away from one another, wherein a corresponding valve seat is formed on each of the fluid outlets in the valve housing. The valve seats are thereby configured in a manner such that one of the sealing surfaces is in sealing contact with one of the valve seats in one of the closure positions. I.e. a first sealing surface can come to bear on first valve seat and a second sealing surface on a second valve seat, wherein this can only be effected alternately, so that one valve seat is always closed and the other open. Hereby, the sealing surfaces are usefully arranged on two sides of the shut-off body which are away from another in the pivoting plane of the shut-off body, wherein the sealing surfaces of the shut-off body and/or the valve seats formed on the two fluid outlets are configured and aligned in a manner such that the shut-off body completely seals the respective fluid outlet in its two closure positions. In this context, it is advantageous if an outer edge of the sealing surface is conically chamfered, wherein the shut-off body engages into a region which is correspondingly chamfered on the fluid outlet and which forms the valve seat.

The sealing surfaces and the valve seats are preferably configured in a manner such that a purely metallic sealing pairing or a metallic—soft-sealing sealing pairing is given between the sealing surface and the associated valve seat. The regions of the sealing surfaces and of the valve seats which come into sealing contact can therefore be selectively configured in a metallic or soft-sealing manner, depending on the case of application. The following sealing pairings can then result: 1. metallic sealing surface or contact surface on the sealing surface and metallic valve seat; 2. metallic sealing surface or contact surface on the sealing surface and soft-sealing valve seat; and 3. soft-sealing contact surface on the sealing surface and metallic valve seat.

The contact surface of the sealing surface is thereby that region which actually comes to bear on the valve seat.

The linear drive usefully engages on one of the sealing surfaces, preferably in its center. This means that the linear drive engages in the center of a surface spanned by the contact region or the contact surface of the sealing surface. Thereby, the contact region or the contact surface is that part of the sealing surface which comes to sealingly bear on the valve seat. Accordingly, a linearly movable part of the linear drive is coupled in movement to the shut-off body on one of the two sealing surfaces of the shut-off body. If this movement coupling is effected centrally on the sealing surface, as is preferably envisaged, then this has the advantage that by way of this, the pressing pressure which is produced by the linear drive and with which the sealing surfaces are pressed against the respective valve seat is largely equal over the whole contact region of the sealing surface and valve seat.

The pivot axis, about which the shut-off body is pivoted into its closure positions, is usefully situated outside the sealing surfaces. Hereby, it is particularly useful if the pivot axis is arranged at the outer side of the complete shut-off body, so that the shut-off body as whole can be pivoted into both its closure positions.

Moreover, the pivot axis of the shut-off body is preferably arranged in the valve housing of the shuttle valve, outside the flow paths from the fluid inlet to the fluid outlets. Accordingly, the pivot axis is preferably placed in a part of the valve housing which lies remotely from the regions which, through which a fluid flows on its path from the fluid inlet to one of the fluid outlets.

According to a further advantageous embodiment of the shuttle valve according to the invention, the shut-off body is articulated on the pivot axis or pivot via a pivot arm arranged on the shut-off body at the outer side. Accordingly, the shut-off body is preferably pivotable about a pivot axis which is distanced to the shut-off body, wherein the pivot arm creates the distance between the pivot axis and the shut-off body. The pivot arm here is advantageously arranged on a peripheral wall of the shut-off body which connects the two sealing surfaces of the shut-off body to one another. A larger movement region between the closure positions is realized by distancing the pivot axis from the shuttle valve, by which means flow paths which are optimized and larger in cross section become possible.

The shut-off body is further preferably connected to the pivot arm in a movable and in particular articulated manner. This permits the shut-off body to always be able to be aligned parallel to the valve seat, so that the sealing surface of the shut-off body comes to bear on the valve seat in a uniform manner. The movable connection between the shut-off body and the pivot arm is preferably configured such that it automatically assumes a defined idle position when the shut-off body is not located in one of the closure positions or does not bear on a valve seat. This can be achieved for example by way of one or more spring elements which hold these in a defined idle position as long as no external forces act upon the shut-off body. By way of this, one succeeds in the shut-off body not moving out of its ideal sealing position during the switching procedure between the two closure positions.

The pivot axis of the shut-off body is usefully defined by a jointed articulation of the shut-off body which is situated in the inside of the valve housing. I.e., a rotary joint is provided in the inside of the valve housing, said rotary joint in the simplest case comprising a first joint element such as e.g. a joint pin which is stationarily arranged in the valve housing, forms the pivot axis and on which a second joint element connected to the shut-off body is rotatably mounted. The arrangement of the pivot axis or the articulated mounting of the shut-off body in the inside of the housing renders sealed, rotary feed-throughs on the housing superfluous.

One further advantageously envisages the linear drive being coupled to the shut-off body by way of a joint connection and the joint connection preferably being designed such that the joint connection additionally permits a relative movement between the linear drive and the shut-off body in a direction transverse to the pivot axis and transverse to the movement axis of the linear drive. This design takes into account the fact that with its pivot movement relative to the linear drive, the shut-off body also moves in a direction transverse to the movement axis of the linear drive, wherein the joint connection between the linear drive and the shut-off body effects the compensation of a linear shift/offset transverse to the pivot axis hereby arising between the linear drive and the shut-off body.

In a preferred further development, in particular of the latter-mentioned embodiment with which the linear drive is coupled to the shut-off body by a joint connection, one preferably envisages the joint connection comprising a joint head which is arranged on the linear drive, is guided in a recess in the shut-off body in a rotational movable manner and in a linear manner transversely to the pivot axis. For this, the recess formed on the shut-off body, for compensating the shifting occurring between the linear drive and the shut-off body with the pivoting movement of the shut-off body is usefully significantly larger in a direction transverse to the pivot axis of the shut-off body than the largest outer cross section of the joint head of the linear drive which is guided in the recess. The joint head for example can be designed as a cylinder or ball which engages behind a linear guide extending on the shut-off body transversely to its pivot axis. I.e. the joint head for example engages into a groove which at its open side comprises inwardly directed projections or shoulders, behind which the joint head engages. The cylindrical or spherical shape of the joint head permits a pivot movement of the joint head in the recess or receiver in the shuttle valve, said recess or receiver being e.g. formed by the groove.

The joint head of the linear drive is preferably positively held in a recess of the shut-off body by way of an insert, in a manner such that a relative movement between the shut-off body and the joint head is possible transverse to the movement axis of the linear drive. A rotary movement about a middle axis of the joint head in the recess is further preferably simultaneously possible. The insert is preferably designed such that for assembly, it can be removed from the recess or inserted into the recess after insertion of the joint head and be fixed in this recess, for example by way of screws. The insert can thus engage behind the joint head, so that this cannot move out of the recess. The joint head can thus transmit forces onto the shut-off body in both movement directions of the linear drive and move this.

According to a further preferred embodiment of the shuttle valve according to the invention, a linearly movable part of the linear drive is led through one of the fluid outlets. Accordingly, a linearly movable part of the linear drive such a linearly movable spindle of a linear drive for example engages through one of the two fluid outlets into the valve housing, where this part of the linear drive of coupled in movement to the shut-off body. This design in particular is useful if the linearly movable part of the linear drive engages on a sealing surface of the shut-off body. The linearly movable part of the linear drive is moreover preferably led through a housing wall of the housing or of a conduit section connecting to the outlet, in a sealed manner.

Apart from the previously described shuttle valve, a safety valve arrangement is also the subject-manner of the invention. This safety valve arrangement comprises a shuttle valve and two safety valves arranged at the outlet side of the shuttle valve. The safety valve arrangement according to the invention is characterized in that the shuttle valve is designed according to the preceding description, wherein two safety valves are each connected to a fluid outlet.

The invention is hereinafter explained in more detail by way of one embodiment represented in the drawings. The drawings, each in a schematically simplified manner and in a sectioned view. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
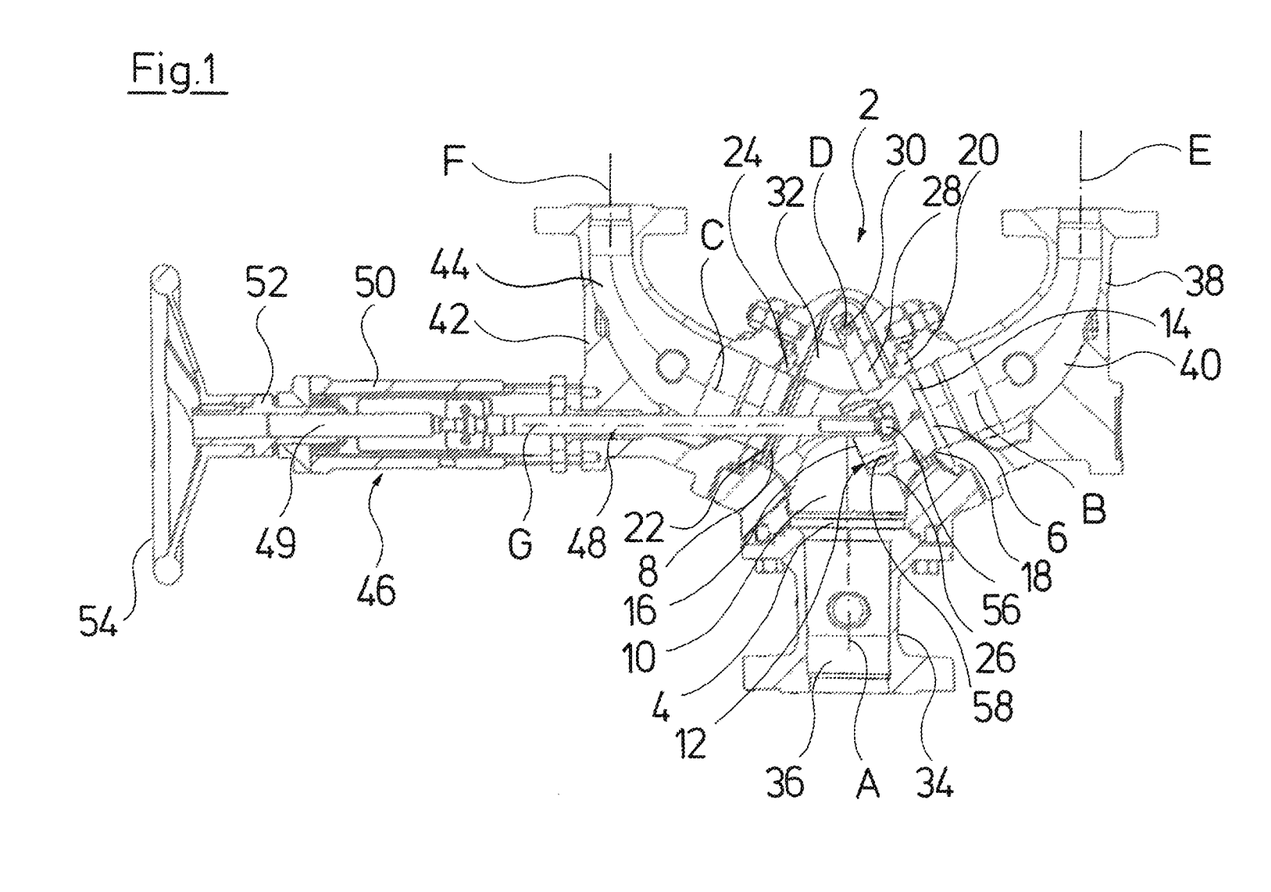
FIG. 1 is a schematic sectional view of a shuttle valve according to the invention, in a first closure position.
Figure 2:
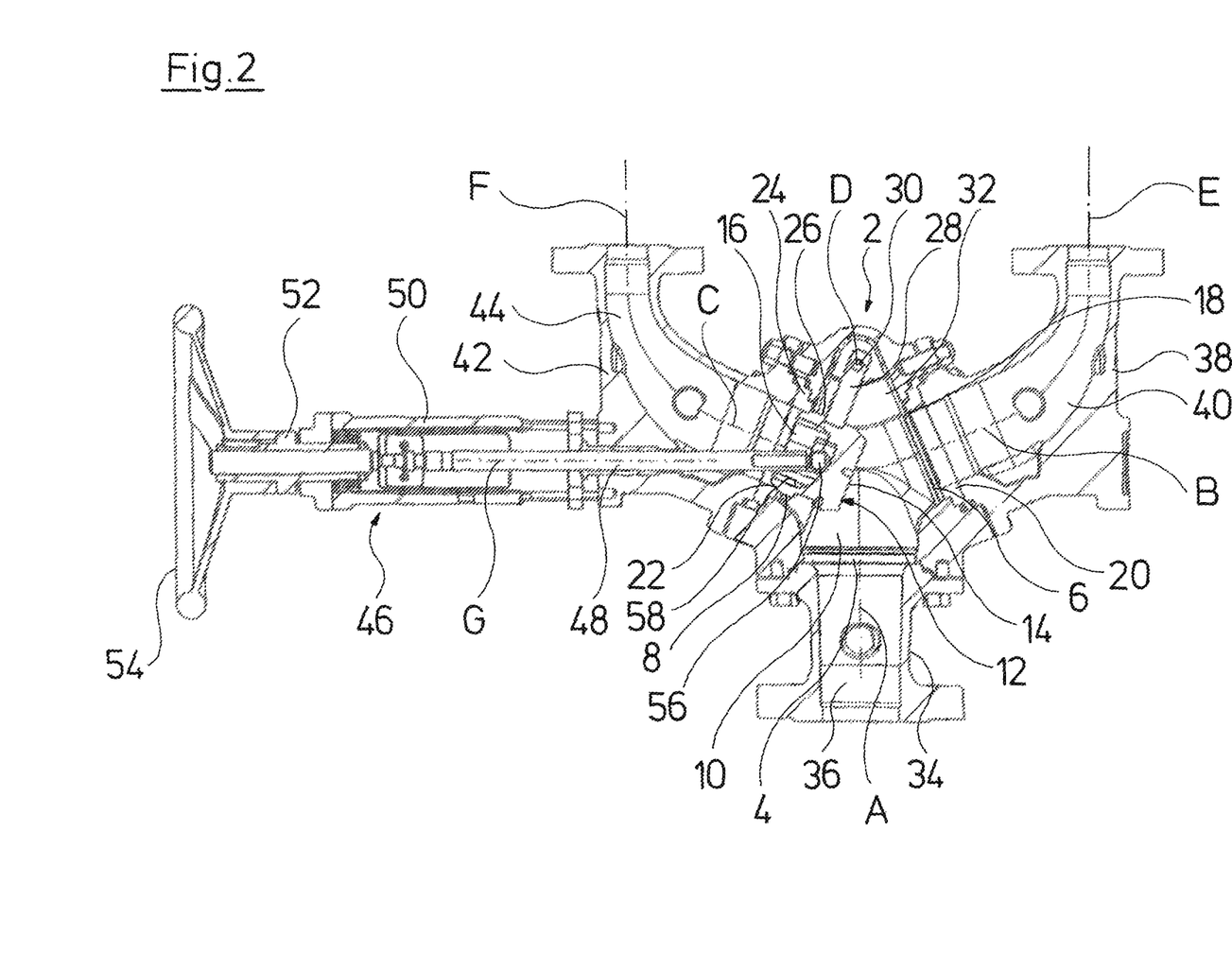
FIG. 2 is a schematic sectional view of the shuttle valve according to FIG. 1, in a second closure position.

Referring to the drawings, the shuttle valve represented in FIGS. 1 and 2 is part of a safety valve arrangement, with which an overpressure prevailing in a fluid-filled space of a technical facility is to be relieved. The shuttle valve comprises a valve housing 2, on which a fluid inlet 4 and two fluid outlets 6 and 8 are arranged. The arrangement of the fluid inlet 4 and of the fluid outlets 6 and 8 on the valve housing 2 is such that a middle axis A of the fluid inlet 4 is offset from the middle axis B of the fluid outlet 6 as well as the middle axis C of the fluid outlet 8 in each case by an angle of 112.5°, so that the angle between the middle axes B and C of the two fluid outlets 6 and 8 is 135°. Thereby, the middle axes A, B and C lie in a common plane. The offset between the middle axes A, B and C can however also be selected differently. Thereby, the angle between the middle axis A of the fluid inlet and the middle axes B and C of the fluid outlets 6, 8 is preferably not smaller than 90°. The angles between the middle axes A, B and C preferably each lie in a range between 100° and 140°. This arrangement has the advantage that a smaller deflection of the flow from the fluid inlet to the fluid outlet is effected than if these are arranged at an angle of 90° to one another. Lower pressure losses consequently occur.

A shut-off body 12 with which one of the fluid outlets 6 and 8 can be each closed in a selective or alternating manner is arranged in an interior 10 of the valve housing 2, through which interior the flow paths run from the fluid inlet 4 to the two fluid outlets 6 and 8. For closing the fluid outlets 6 and 8, the shut-off body 12 at two sides which are directly away from one another comprise two sealing surfaces 14 and 16 which are conically chamfered on their outer edge, wherein in a first closure position of the shut-off body 12, in which this body closes the first fluid outlet 6, the first sealing surface 14 comes to bear on a first valve seat 18 in a fluid tight manner, said valve seat being formed on an annular sleeve 20 arranged at the outer side of the first fluid outlet 6 and engaging into the valve housing (FIG. 1) and wherein the second sealing surface 16 in a second closure position of the shut-off body 12, in which this body closes the second fluid outlet 8 comes to bear in a fluid-tight manner on a second valve seat 22 formed on an annular sleeve 24 arranged at the outside of the fluid outlet 8 and engaging into the valve housing 2 (FIG. 2).

The shut-off body 12 is pivotable into its two closure positions. For this, a pivot arm 28 is arranged on a peripheral wall 26 of the shut-off body 12 which connects the sealing surfaces 14 and 16, and this pivot arm extends in a direction normal to the peripheral wall 26. The pivot arm 28 in the region of its end which is away from the shut-off body 12 is articulated on a joint pin 30 forming the pivot axis D of the shut-off body 12. The joint pin 30 and thus also the pivot axis D of the shut-off body 12 are arranged in the valve housing 2 lying on the middle axis A of the fluid inlet 4, in a region 32 situated outside the flow paths from the fluid inlet 4 to the fluid outlets 6 and 8. The pivot axis D is situated in the inside of the valve housing 2, at a side which is away from the fluid outlet 4. The alignment of the joint pin 30 and of the pivot axis D is hereby normal to the middle axis A of the fluid inlet and normal to a plane spanned by the middle axis B and C of the fluid outlets 6 and 8.

A connection branch 34 is arranged on the valve housing 2 coaxially to the middle axis A of the fluid inlet 4. The connection branch 34 forms a flow path from a space of a technical facility which is not represented in the drawings and which is subjected to a fluid pressure, to the fluid inlet 4 of the valve housing 2, wherein an inner lumen 36 of the connection branch 34 which forms the flow path continuously enlarges from an inlet-side cross section which is smaller than the cross section of the fluid inlet 4, to the cross section of the fluid inlet 4.

A connection branch 38 on the valve housing 2 connects onto the first fluid outlet 6. The connection branch 38 has an inner lumen 40, whose cross section continuously tapers departing from the end of the connection branch 38 which faces the fluid outlet 6 and at which the cross section of the inner lumen 40 corresponds to the cross section of the fluid outlet 6.

A further connection branch 42 is arranged on the valve housing 2 adjacently to the second fluid outlet 8. With this connection branch 42 too, the cross section of an inner lumen 44 continuously tapers to a smaller cross section, departing from the end of the connection branch 42 which faces the fluid outlet 8 and at which the cross section of the inner lumen 44 corresponds to the cross section of the fluid outlet 6.

The connection branch 38 and the connection branch 42 are designed as pipe bends. Here, a middle axis E of the inner lumen 40 of the connection branch 38 at the end of the connection branch 38 which faces the first fluid outlet 6 corresponds to the middle axis B of the fluid outlet 6 and at the end of the connection branch 38 which is away from the fluid inlet 6 runs parallel to the middle axis A of the fluid inlet. A middle axis F of the inner lumen 44 of the connection branch 42, at the end of the connection branch 42 which faces the second fluid outlet 8 corresponds to the middle axis C of the fluid outlet 8 and at the end of the connection branch 42 which is away from the fluid inlet 8 likewise runs parallel to the middle axis A of the fluid inlet. A safety valve which is likewise not represented in the drawings is arranged in each case at the ends of the connection branches 38 and 42 which are away from the valve housing 2, with which safety valves an overpressure prevailing in the space connected to the connection branch 34 can be selectively relieved.

The represented shuttle valve is provided with a linear drive 46 for pivoting the shut-off body 12 into its two closure positions. The linear drive 46 is a hand-actuated spindle drive. This spindle drive comprises a threaded spindle 49 which is coupled to an actuation rod 48 led through an outer wall of the connection branch 42 and the fluid inlet 8 into the interior 10 of the valve housing 2 where it is coupled in movement to the shut-off body 12. The actuation rod 48 defines a movement axis G of the linear drive 46. The alignment of the actuation rod 48 or the alignment of the movement axis G are such that they extend transversely to the pivot axis D formed by the joint pin 30. The actuation rod 48 as well as the threaded spindle 49, at the outer side of the connection branch 42 are led through a housing 50 which is arranged there, wherein a rotatable spindle nut 52 of the spindle drive which engages into the housing 50 is arranged at an end of the housing 50 which is away from the valve housing 2. The spindle nut 52 is connected to a hand wheel 54 in a rotationally fixed manner for the manual actuation.

The actuation rod 48 at its end engaging into the interior 10 of the valve housing 2 is articulately connected to the shut-off body 12. The actuation rod 48 at its end engaging into the interior 10 of the valve housing 2 comprises a joint head 56, for forming this joint connection. The joint head 56 is designed in an essentially cylindrical manner and has a cross section which is larger than the cross section of a connection to the actuation rod 48. The actuation rod 48 engages with the joint head 56 into a recess 58 formed centrally on the shut-off body 12 on its sealing surface 16.

A shoulder which subdivides the recess 58 into a section 60 directly adjacent the sealing surface 16 and into a section 62 connecting to this section in the direction of the sealing surface 14 (FIG. 3) is formed on the recess 58. The dimension of the section 60 directly adjacent to the sealing surface 16 in a direction parallel to the sealing surface 16 is hereby larger than the corresponding dimension of the section 62 facing the sealing surface 14, wherein the latter mentioned dimension is larger than the maximal cross section of the joint head 56.

Figure 3:
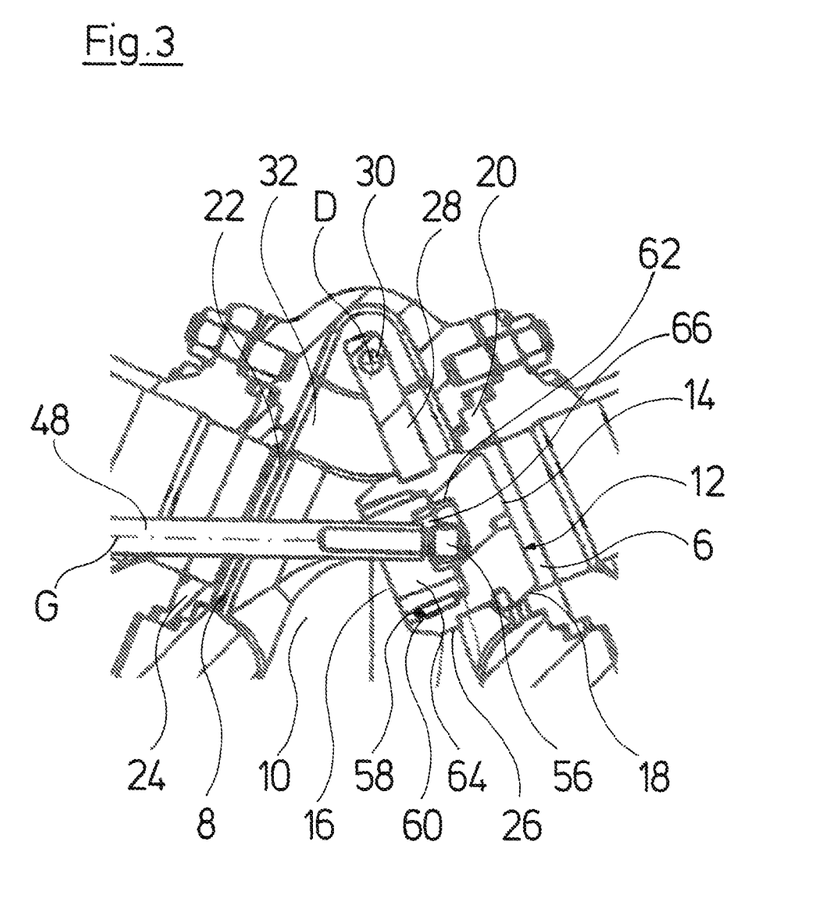
FIG. 3 is an enlarged schematic sectional view of a part-region of FIG. 1.

An insert 64, through which the actuation rod 48 is led engages into the section 60 of the recess 58 which is directly adjacent the sealing surface 16. The insert 64 encompasses the joint head 56 and holds this in the recess 58. An outer side of the insert 64 is hereby flush with the sealing surface 16 of the shut-off body 12. A recess 66 which with regard to its position and dimensions corresponds essentially to the section 62 of the recess 58 which faces the sealing surface 14 is formed on an outer side of the insert 64 which is directly away from the above-mentioned outer side. This section 62 of the recess 58 together with the recess 66 formed on the insert 64 forms a receiving space for the joint head 56 which is arranged at the end of the actuation rod 48 and which is positively fixed herein in the direction of the movement axis G of the linear drive 46, but which hereby permits a relative movement between the actuation rod 48 and the joint head 56 and the shut-off body 12 in a direction transverse to the pivot axis D and transverse to the movement axis G of the linear drive 46.

Figure 4:
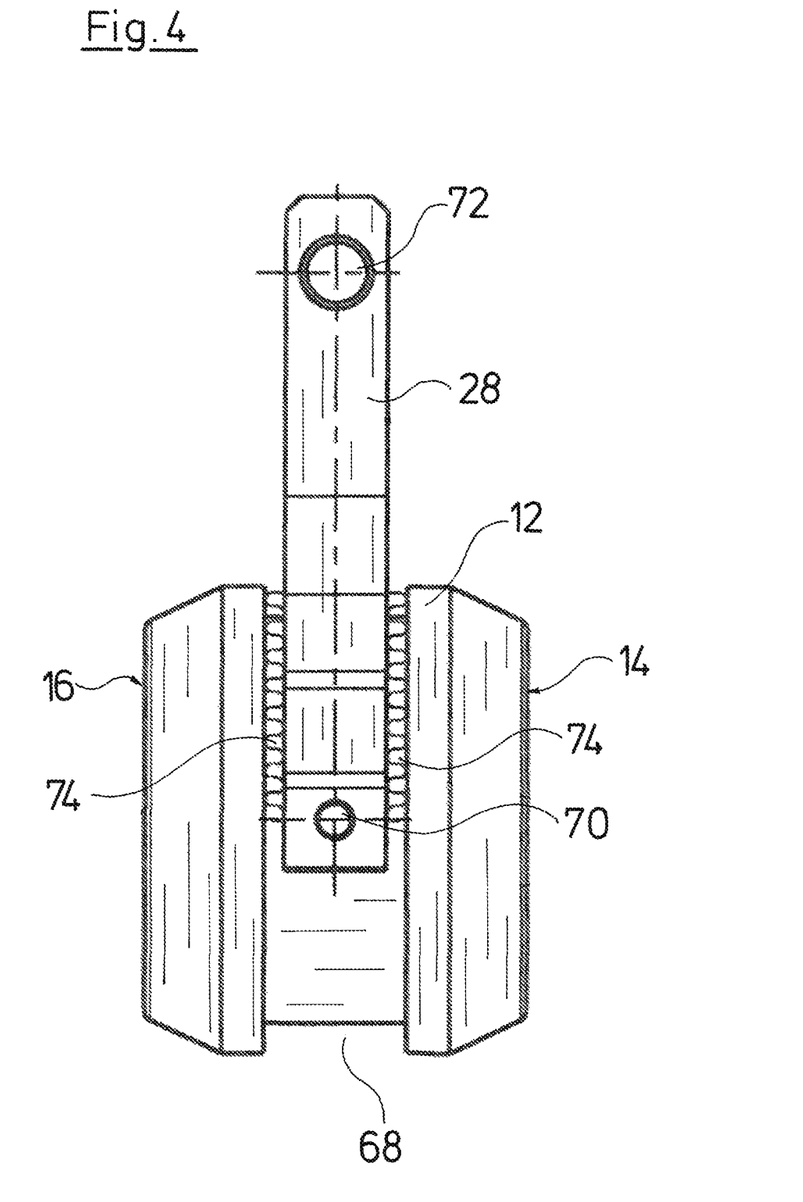
FIG. 4 is a lateral view of a first embodiment of a shut-off body, with a connecting pivot arm.
Figures 5, 6:
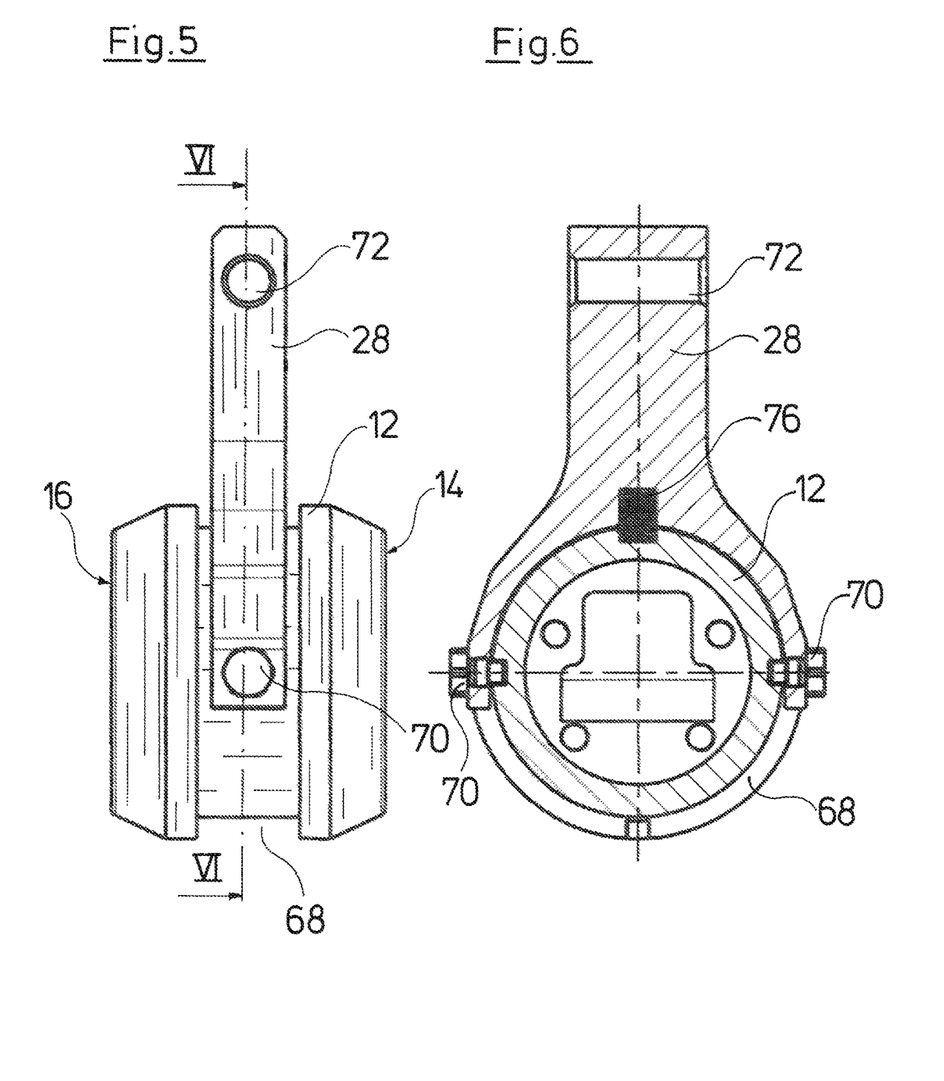
FIG. 5 is a lateral view of a second embodiment of the shut-off body with a connecting pivot arm.
FIG. 6 is a sectioned view of the arrangement in FIG. 5, along the line VI-VI in FIG. 5.

As is explained by way of FIGS. 4-6, the shut-off body 12 is movably connected to the pivot arm 28. For this, the pivot arm 28 at its end facing the shut-off body 12 is designed in such a fork-like manner that it engages around the shut-off body over half its periphery. Thereby, the pivot arm 28 engages into an annular groove 68 which peripherally surrounds the outer periphery of the shut-off body 12. At the diameter line of the shut-off body 12, the pivot arm 28 with its fork ends is articulately connected to the shut-off body 12 via two bolts 70 arranged diametrically opposite one another. The pivot arm 28 at the opposite longitudinal end comprises a through-hole 72 which extends parallel to the longitudinal axes of the bolts 70 and through which the pivot axis D for pivoting the pivot arm 28 extends. According to a first embodiment according to FIG. 4, spring elements 74 in the form of corrugated spring strips extending around half the periphery of the annular groove 68 are arranged in the annular groove 68 at two sides of the pivot arm 28. These spring strips ensure that the pivot arm 28 is centered in the annular groove 68 in the idle position, i.e. that the shut-off body 12 is held in a middle position with respect to the pivot arm 28. By way of this, one prevents the shut-off body 12 from tilting due to its intrinsic weight during the switch-over procedure between the two sealing positions.

FIGS. 5 and 6 show a variant of the articulation of the pivot arm 28 on the shut-off body 12. In contrast to the solution according to FIG. 4, a central spring element 76 is provided with the solution according to FIGS. 5 and 6. This spring element 76 for example can be a helical spring. The spring element 76 with one end engages into a recess centrally in the pivot arm 28 and at the opposed end into a recess on the periphery of the shut-off body 12, i.e. on the base of the annular groove 68. This spring element 76 also serves for holding the shut-off body 12 in a centered manner or centrally to the pivot arm 28, in an idle position in which the shut-off body 12 is not in one of the sealing positions.

Figure 7:
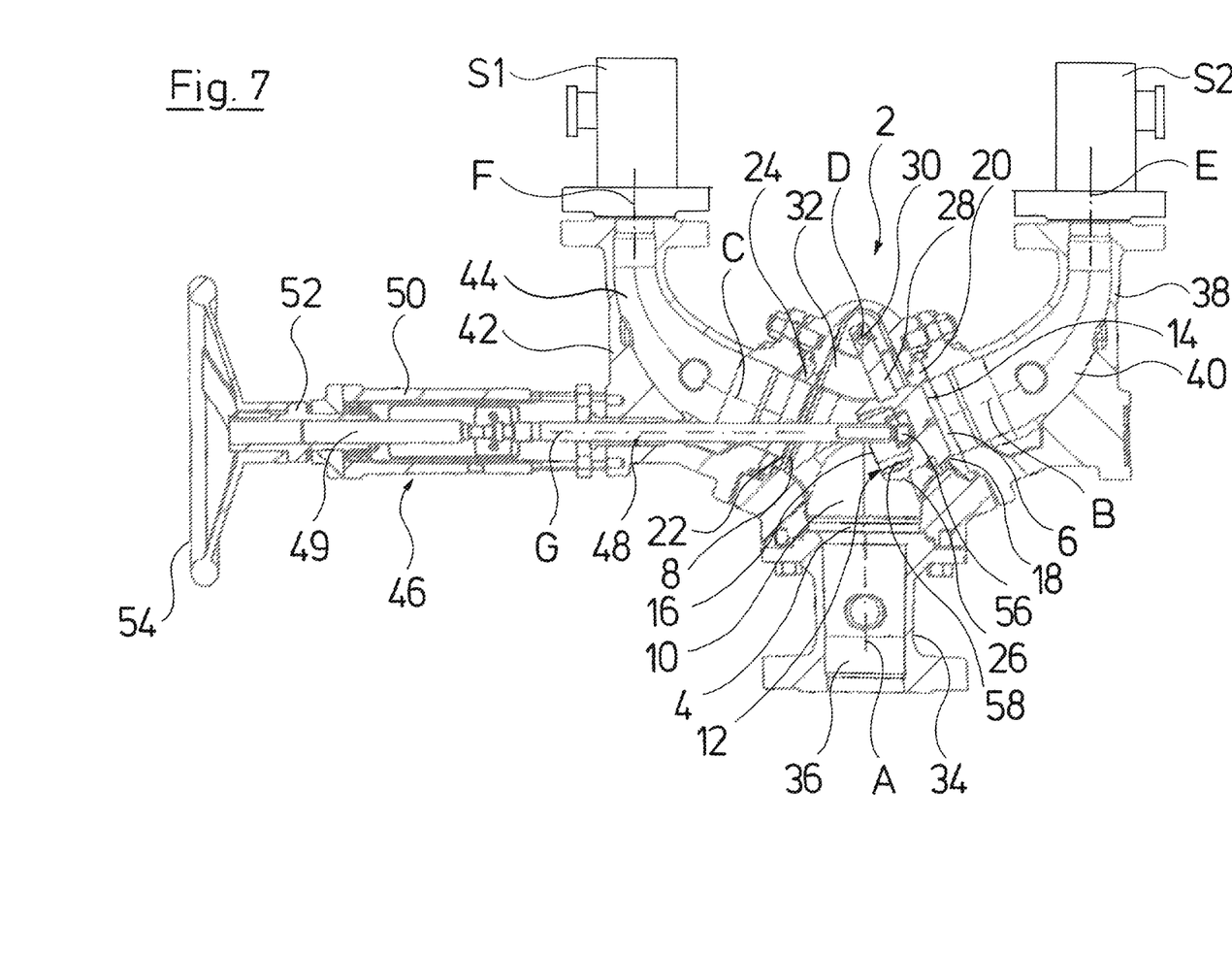
FIG. 7 is a schematic sectional view showing the shuttle valve according to the invention with two safety valves.

FIG. 7 shows a safety valve arrangement according to the invention. The safety valve arrangement comprises a change-over valve as described and two safety valves S1 and S2, arranged on the exit sides of the change-over valve.

While specific embodiments of the invention have been shown and described in detail to illustrate the application of the principles of the invention, it will be understood that the invention may be embodied otherwise without departing from such principles.

What is claimed is:

1. A shuttle valve for a safety valve arrangement, the shuttle valve comprising:
    a valve housing comprising a fluid inlet and two fluid outlets;
    a movable shut-off body arranged in the valve housing, the movable shut-off body being moveable between two closure positions, wherein in each of the two closure positions the movable shut-off body closes one of the fluid outlets;
    a shut-off body pivot with a shut-off body pivot axis, wherein the shut-off body is connected to the shut-off body pivot to pivot about the pivot axis; and
    a linear drive coupled to the shut-off body such that the shut-off body is pivotable between the closure positions by moving the linear drive, the shut-off body comprising two sealing surfaces which are spaced away from one another, wherein a corresponding valve seat is formed on each of the fluid outlets in the valve housing, wherein the valve seats being configured such that in one of the closure positions, one of the sealing surfaces is in sealing contact with one of the valve seats, the linear drive engaging on one of the sealing surfaces.

2. A shuttle valve according to claim 1, wherein the linear drive is a hand-actuated linear spindle drive.

3. A shuttle valve according to claim 1, wherein a movement axis of the linear drive extends transversely to the shut-off body pivot axis.

4. A shuttle valve according to claim 1, wherein the linear drive engages on the shut-off body radially distanced to the shut-off body pivot axis.

5. A shuttle valve according to claim 1, wherein the sealing surfaces and the valve seats are configured such that a purely metallic sealing pairing or a metallic-soft-sealing sealing pairing is provided between the sealing surface and the associated valve seat.

6. A shuttle valve according to claim 1, wherein the linear drive engages a center or essentially or nearly in the center of the one of the sealing surfaces.

7. A shuttle valve according to claim 1, wherein the shut-off body pivot axis is situated outside the sealing surfaces.

8. A shuttle valve according to claim 1, wherein the shut-off body pivot axis is arranged in the shuttle valve outside flow paths from the fluid inlet to the fluid outlets.

9. A shuttle valve according to claim 1, wherein at least one spring element is arranged between the shut-off body and the pivot arm such that the shut-off body is held in a defined idle position when the shut-off body is not located in one of the closure positions.

10. A shuttle valve according to claim 1, wherein the shut-off body pivot axis is defined by a jointed articulation of the shut-off body which is situated in an inside of the valve housing.

11. A shuttle valve according to claim 1, wherein the linear drive is coupled to the shut-off body by a joint connection and the joint connection is configured such that the joint connection permits a relative movement between the linear drive and the shut-off body in a direction transverse to the shut-off body pivot axis and transverse to a movement axis of the linear drive.

12. A shuttle valve according to claim 11, wherein:
    the joint connection comprises a joint head which is arranged on the linear drive and which is guided in a rotationally movable manner in a recess in the shut-off body and in guided in a linearly movable manner transversely to the shut-off body pivot axis; and
    the joint head of the linear drive is positively held by an insert in a recess of the shut-off body such that a relative movement between the shut-off body and the joint head is possible transverse to the movement axis of the linear drive.

13. A shuttle valve according to claim 1, wherein a linearly movable part of the linear drive is led through one of the fluid outlets.

14. A shuttle valve according to claim 1, wherein one of the two fluid outlets is located on one side of the movable shut-off body and another one of the two fluid outlets is located on another side of the movable shut-off body, the movable shut-off body being arranged between the one of the two fluid outlets and the another one of the two fluid outlets.

15. A shuttle valve according to claim 1, wherein a space is defined between the one of the two fluid outlets and the another one of the two fluid outlets, the one of the two fluid outlets being located opposite the another one of the two fluid outlets, the movable shut-off body being arranged in the space.

16. A shuttle valve according to claim 1, whereon one of the two fluid outlets faces in a direction of one side of the movable shut-off body and another one of the two fluid outlets faces in a direction of another side of the movable shut-off body, the one side of the movable shut-off body being located opposite the another side of the movable shut-off bod.

17. A safety valve arrangement, comprising:
a first safety valve;
a second safety valve; and
a shuttle valve comprising:
a valve housing comprising a fluid inlet and two fluid outlets;
a movable shut-off body arranged in the valve housing, the movable shut-off body being moveable between two closure positions, wherein in each of the two closure positions the movable shut-off body closes one of the fluid outlets;
a shut-off body pivot with a shut-off body pivot axis, wherein the shut-off body is connected to the shut-off body pivot to pivot about the shut-off body pivot axis; and
a linear drive coupled to the shut-off body such that the shut-off body is pivotable between the closure positions by moving the linear drive, wherein the first safety valve is connected to one of the fluid outlets and the second safety valve is connected to another of the fluid outlets, the linear drive being coupled to the shut-off body by a joint connection and the joint connection being configured such that the joint connection permits a relative movement between the linear drive and the shut-off body in a direction transverse to the shut-off body pivot axis and transverse to a movement axis of the linear drive, the joint connection comprising a joint head which is arranged on the linear drive and which is guided in a rotationally movable manner in a recess in the shut-off body and is guided in a linearly movable manner transversely to the shut-off body pivot axis, the joint head of the linear drive being positively held by an insert in a recess of the shut-off body such that a relative movement between the shut-off body and the joint head is possible transverse to the movement axis of the linear drive.

18. A safety valve arrangement, according to claim 17, wherein a movement axis of the linear drive extends transversely to the pivot axis and the linear drive and engages on the shut-off body radially distanced to the shut-off body pivot axis.

19. A safety valve arrangement, according to claim 17, wherein:
the shut-off body comprises two sealing surfaces which are spaced away from one another;
a corresponding valve seat is formed on each of the fluid outlets in the valve housing; and
the valve seats are configured such that in one of the closure positions, one of the sealing surfaces is in sealing contact with one of the valve seats.

20. A shuttle valve for a safety valve arrangement, the shuttle valve comprising:
a valve housing comprising a fluid inlet and two fluid outlets;
a movable shut-off body arranged in the valve housing, the movable shut-off body being moveable between two closure positions, wherein in each of the two closure positions the movable shut-off body closes one of the fluid outlets;
a shut-off body pivot with a shut-off body pivot axis, wherein the shut-off body is connected to the shut-off body pivot to pivot about the shut-off body pivot axis; and
a linear drive coupled to the shut-off body such that the shut-off body is pivotable between the closure positions by moving the linear drive, wherein a linearly movable part of the linear drive is led through one of the fluid outlets.

* * * * *